(12) United States Patent
Burton

(10) Patent No.: US 11,293,480 B2
(45) Date of Patent: Apr. 5, 2022

(54) BALL CHANNEL ASSEMBLY

(71) Applicant: Burton Technologies, LLC, Ludington, MI (US)

(72) Inventor: John E. Burton, Ludington, MI (US)

(73) Assignee: Burton Technologies LLC, Kenosha, WI (US)

( * ) Notice: Subject to any disclaimer, the term of this patent is extended or adjusted under 35 U.S.C. 154(b) by 956 days.

(21) Appl. No.: 15/779,335

(22) PCT Filed: Feb. 15, 2017

(86) PCT No.: PCT/US2017/018007
§ 371 (c)(1),
(2) Date: May 25, 2018

(87) PCT Pub. No.: WO2017/142973
PCT Pub. Date: Aug. 24, 2017

(65) Prior Publication Data
US 2018/0306233 A1   Oct. 25, 2018

Related U.S. Application Data

(60) Provisional application No. 62/296,028, filed on Feb. 16, 2016.

(51) Int. Cl.
*F16C 11/06* (2006.01)

(52) U.S. Cl.
CPC ...... *F16C 11/0623* (2013.01); *B60Q 2200/32* (2013.01); *Y10T 403/32073* (2015.01)

(58) Field of Classification Search
CPC .............. F16C 11/0619; F16C 11/0623; F16C 11/0642; F16C 11/0647; F16C 11/0661;
(Continued)

(56) References Cited

U.S. PATENT DOCUMENTS

| 2,748,412 A | 6/1956 | Peterson |
| 2,910,260 A | 10/1959 | Tanner |

(Continued)

FOREIGN PATENT DOCUMENTS

| CA | 2484475 | 4/2006 |
| DE | 102005026321 | 1/2006 |

(Continued)

OTHER PUBLICATIONS

Search Report for PCT/US17/18007 dated Jun. 21, 2017.
(Continued)

*Primary Examiner* — Josh Skroupa
*Assistant Examiner* — Kevin J Baynes
(74) *Attorney, Agent, or Firm* — James A. Joyce; Godfrey & Kahn, S.C.

(57) ABSTRACT

A ball channel and ball channel assembly are disclosed with the ball channel having a channel top, a channel bottom, and an inner portion including a first inner sidewall, a second inner sidewall, a first end wall, and a second end wall. A first resilient tab extends from the first inner sidewall with a first tab end surface, and a second resilient tab extends from the second inner sidewall with a second tab end surface. An elongated gutter extends longitudinally along the inner portion and adjacent the channel bottom, wherein the combination of the first and second tab end surfaces and a gutter top surface form a ball track for receiving a head of a ball stud and allowing secured sliding longitudinal movement of the head. An outer portion is also provided having a flange wall that is configured to engage a receiving wall of a mounting panel.

8 Claims, 14 Drawing Sheets

(58) Field of Classification Search
CPC .... F16C 11/103; F16C 11/106; F16C 29/005;
F16C 29/007; Y10T 403/32057; Y10T
403/32073; Y10T 403/32229; Y10T
403/32565; Y10T 403/32573; Y10T
403/32581; Y10T 403/32622; Y10T
403/32631; Y10T 403/32647; Y10T
403/32655; B60Q 1/06; B60Q 1/068;
B60Q 1/076; B60Q 2200/32; F21S
41/675; F21V 14/04; F21V 17/02; F21V
21/30; F21V 21/34
USPC ....... 384/24, 25, 47, 56, 190, 203, 206, 209,
384/246
See application file for complete search history.

(56) References Cited

U.S. PATENT DOCUMENTS

| | | | |
|---|---|---|---|
| 3,139,768 A | 7/1964 | Biesecker | |
| 3,856,423 A | 12/1974 | Uchida | |
| 4,102,585 A | 7/1978 | Herbenar | |
| 4,430,016 A | 2/1984 | Matsuoka et al. | |
| 4,689,725 A | 8/1987 | Saijo et al. | |
| 5,186,531 A | 2/1993 | Ryder et al. | |
| 5,360,282 A | 11/1994 | Nagengast et al. | |
| 5,428,511 A * | 6/1995 | Luallin | B60Q 1/0683 362/287 |
| 5,443,323 A | 8/1995 | Prelat et al. | |
| 5,630,672 A | 5/1997 | McHale | |
| 5,653,548 A | 8/1997 | Amdahl | |
| 5,707,133 A | 1/1998 | Burton | |
| 5,743,618 A * | 4/1998 | Fujino | B60Q 1/0683 362/515 |
| 5,833,347 A | 11/1998 | Nakamura et al. | |
| 5,915,831 A | 6/1999 | Bonin et al. | |
| 5,993,032 A | 11/1999 | Herbers | |
| 6,113,301 A | 9/2000 | Burton | |
| 6,171,012 B1 | 1/2001 | Westphal | |
| 6,209,175 B1 * | 4/2001 | Gershenson | F16B 5/065 24/297 |
| 6,247,868 B1 | 6/2001 | Burton | |
| 6,345,905 B1 | 2/2002 | Kibayashi et al. | |
| 6,550,947 B1 * | 4/2003 | Kibayashi | B60Q 1/076 362/515 |
| 6,758,622 B2 | 7/2004 | Burton | |
| 6,813,991 B2 | 11/2004 | Koth | |
| 6,837,716 B1 | 1/2005 | Brazas | |
| 6,971,777 B2 * | 12/2005 | Casses | B60Q 1/0683 362/421 |
| 6,976,773 B2 | 12/2005 | Cavanna | |
| 7,207,704 B2 * | 4/2007 | Tachiiwa | B60Q 1/0683 362/512 |
| 7,322,768 B2 * | 1/2008 | Ochiai | F16B 21/073 403/122 |
| 7,452,154 B2 * | 11/2008 | Aoshima | F16B 21/082 362/514 |
| 7,845,837 B2 | 12/2010 | Burton | |
| 7,963,715 B2 | 6/2011 | Burton | |
| 9,140,294 B2 | 9/2015 | Burton | |
| 9,157,596 B2 * | 10/2015 | Tachiiwa | B60Q 1/06 |
| 9,291,193 B2 * | 3/2016 | Wainscott | F16C 11/0657 |
| 9,327,637 B2 * | 5/2016 | Kondo | B60Q 1/0683 |
| 9,987,972 B2 | 6/2018 | Burton | |
| 2003/0081989 A1 * | 5/2003 | Kondoh | F16C 11/0638 403/135 |
| 2007/0166096 A1 * | 7/2007 | Lim | F16J 3/042 403/50 |
| 2012/0224915 A1 | 9/2012 | Chien | |
| 2012/0282015 A1 | 11/2012 | Ersoy et al. | |

FOREIGN PATENT DOCUMENTS

| | | | |
|---|---|---|---|
| DE | 102013106562 | 2/2014 | |
| WO | WO-0107832 A1 * | 2/2001 | ............. F21V 17/02 |

OTHER PUBLICATIONS

Office Action issued for Application 102013102197.2 in Germany dated Feb. 6, 2015.
European Search Report dated Sep. 4, 2019.

* cited by examiner

BALL CHANNEL ASSEMBLY

CROSS-REFERENCE TO RELATED APPLICATION

This application claims priority to U.S. Provisional Patent Appl. No. 62/296,028 filed on Feb. 16, 2016, the disclosure of which is incorporated herein by reference in its entirety for all purposes.

FIELD OF THE INVENTION

The present invention relates generally to the field of pivot joint fasteners and has been found particularly useful as a pivot joint for connecting a headlamp adjuster to a reflector of a headlamp assembly. In particular, the present invention is a ball channel assembly that permits a ball stud to both pivot within and slide along the length of a track.

BACKGROUND OF THE INVENTION

Pivotable spherical joints, commonly referred to as ball joints, generally include a ball stud engaged in a socket. Such joints have a wide variety of applications where a pivotable connection between two parts is desirable. For example, they may be used in many types of linear actuators and have been found to be particularly useful in automotive lamp assemblies. As seen generally in FIG. 1 of U.S. Pat. No. 5,707,133 the disclosure of which is incorporated herein by reference for all purposes, automotive lamp assemblies used as headlights typically comprise several basic parts: a support frame, a reflector, a lens, a bulb, and one or more adjusters.

In the automotive lamp assembly example, the support frame houses the reflector and the bulb on a pivotable mounting to allow the aim of the light to be adjusted using the adjuster. The lens seals the front of the assembly to protect it from the elements assailing the front end of the vehicle and provides an aerodynamic shape and attractive appearance. Typically, the reflector mounts inside the housing on one fixed ball joint and is adjustable horizontally and vertically using adjusters that interface with the reflector through moving ball joints. The moving ball joints are moveable by actuating the adjusters connected to the moving ball joints by a ball stud having a head and a shaft. Another type of automotive headlamp assembly that uses linear actuators is shown in U.S. Pat. No. 5,360,282. In this type of headlamp assembly the linear actuator is mounted to a bracket and the ball joint end supports a reflector, lens and light bulbs. This type of application requires a higher strength ball joint due to the additional weight being supported. In particular, pull-out strength of the ball joint needs to be greater to withstand vibration.

Conventional ball joints for use in automotive lamp assemblies typically include a ball stud with a spherical engagement head extending from an adjuster. The ball stud is moveable linearly in and out of the adjuster. While generally effective, there are a number of shortcomings to using a ball stud in a conventional socket that includes a plurality of resilient tabs to retain the ball stud. One such shortcoming is that the tabs typically contact the ball stud sphere up to or on a "tangent point" that is on an imaginary line between the pivot center of the ball stud and the center of the resilient tab, e.g., the configuration shown in U.S. Pat. No. 6,758,622, the disclosure of which is incorporated herein by reference for all purposes. This configuration causes the force generated when the stud is subjected to pull-out force, to be directed along the imaginary line. This configuration results in a condition where the ball stud may be pulled out of socket under certain conditions of operation, such as vibration while supporting heavier reflectors or in heavier headlamp assemblies, like the one previously referenced in U.S. Pat. No. 5,360,282, leaving the adjuster non-operational. This unexpected pull-out generally occurs because the retention tabs are necessarily flexible to allow the head to be installed in the socket. Though pull-out of the ball stud is resisted to some degree of success, if enough pull-out force is applied, the tabs deflect and the ball stud head slips through and "pops out." Reducing the flexibility of tabs is not a desirable option because it would either be too difficult to insert the ball stud head into socket, or the elasticity of the tabs would be lessened to the degree that they would break off during insertion of the ball stud.

Insertion force of a ball stud into a socket in an automotive headlamp assembly is typically desired to be less than 125N to allow for hand assembly. Most existing ball-sockets are not able to achieve such a low insertion force without sacrificing pull out resistance due to their construction. As a result, the typical insertion force for the existing ball-sockets (when using a full round plastic ball stud) is around 199N when the socket is made from a polyoxymethylene ("POM") plastic with a relatively flexible tensile modulus of around 1300 MPa. And the pull-out force is roughly the same. Unfortunately, it is often desired to achieve a pull-out force resistance of 400N or higher.

While steel ball studs, particularly those with an undercut behind the head of the ball stud or ears that engage tabs or other structure can achieve high pull-out force resistance, it is often preferred to use a plastic ball stud to enable the use of more compact and lighter weight adjuster designs. Further, plastic ball studs can be designed that have undercuts behind the heads, tabs or other retaining structure, but for manufacturing, installation, and design flexibility, a full round ball stud head is generally preferred.

One solution to the need for an even higher pull-out resistance than that achieved using a design such as the one disclosed in U.S. Pat. No. 6,758,622, is disclosed in U.S. Pat. No. 9,140,294, the disclosure of which is incorporated herein by reference for all purposes. This design has proven to be quite effective in enabling a relatively low insertion force to be applied when inserting the ball stud into the socket but then achieves a much higher pull-out resistance (in the area of 700N using certain materials) when the ball stud is pulled out of the socket. This design does not, however, permit sliding movement.

Accordingly, the need exists for an improved track style ball socket that securely retains a ball stud placed therein, permits the ball stud to both pivot and slide, is cost effective, has a suitable insertion force requirement, and has significant resistance to accidental pull-out.

SUMMARY OF THE INVENTION

The present invention is a ball channel assembly that includes a ball channel engageable in an opening, such as an opening in a headlamp reflector, accepts a ball stud with a minimal amount of insertion force required, permits the ball stud to both pivot and slide within the channel, and provides a significant pull-out force resistance.

In at least some other embodiments, a ball channel is disclosed that includes: a channel top and a channel bottom; an inner portion including a first inner sidewall, a second inner sidewall, a first end wall, and a second end wall; a first resilient tab extending from the first inner sidewall and having a first tab end surface opposite the first inner sidewall; a second resilient tab extending from the second inner sidewall and having a second tab end surface opposite the second inner sidewall; an elongated gutter extending longitudinally along the inner portion and adjacent the channel bottom, wherein the combination of the first and second tab end surfaces and a gutter top surface form a ball track for receiving a head of a ball stud and allowing sliding longitudinal movement of the head along a first axis extending between the first and second end walls, while restricting movement of the head along a second axis perpendicular to the first axis; and an outer portion including a flange extending substantially therearound, wherein the flange includes a flange wall that extends outward relative to the inner portion.

In at least some further embodiments, a ball channel is disclosed that includes: a channel top and a channel bottom; an inner portion including a first inner sidewall, a second inner sidewall, a first end wall, and a second end wall; a first resilient tab extending from the first inner sidewall and having a first tab end surface opposite the first inner sidewall; a second resilient tab extending from the second inner sidewall and having a second tab end surface opposite the second inner sidewall; a gutter extending longitudinally along the inner portion and adjacent the channel bottom; and an outer portion including a flange extending substantially therearound, wherein the flange includes a center flange wall, a upper flange wall extending above the center flange wall, and a lower flange wall extending below the center flange wall, and wherein the center flange wall extends outward relative to the inner portion.

In at least some embodiments, a ball channel assembly is disclosed that includes: a ball channel comprising: a channel top and a channel bottom; an inner portion including a first inner sidewall, a second inner sidewall, a first end wall, and a second end wall; a first resilient tab extending from the first inner sidewall and having a first tab end surface opposite the first inner sidewall; a second resilient tab extending from the second inner sidewall and having a second tab end surface opposite the second inner sidewall; an elongated gutter extending longitudinally along the inner portion and adjacent the channel bottom; an outer portion including a flange extending substantially therearound, wherein the flange includes a flange wall; and a mounting panel comprising: a receiving wall that extends between a top mounting panel surface and a bottom mounting panel surface, and forming a mounting panel opening therebetween; wherein the flange wall of the ball channel is complementary in shape to the receiving wall, such that a upon securement of the ball channel to the mounting panel, the flange wall and the receiving wall are in mating abutment.

In at least some embodiments, a ball channel assembly is disclosed that includes a ball channel comprising: a channel top and a channel bottom; an inner portion including a plurality of walls; an outer portion including a flange extending substantially therearound, a neck wall adjacent the channel top having a latching end extending therefrom, wherein the flange includes a flange wall having a pivot wall portion situated below the latching end of the neck wall; and a latching fastener extending from the outer portion and having a snap engagement ledge; and a mounting panel comprising: a receiving wall that extends between a top mounting panel surface and a bottom mounting panel surface, forming a mounting panel opening therebetween, wherein the receiving wall is substantially complementary in shape to the flange wall of the ball channel, such that securement of the mounting panel to the ball channel provides mating abutment substantially between the flange wall and the receiving wall; and a latching protrusion extending from the top mounting panel surface, for receiving the snap engagement ledge thereon when the ball channel is engaged with the mounting panel.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

Figure 1:
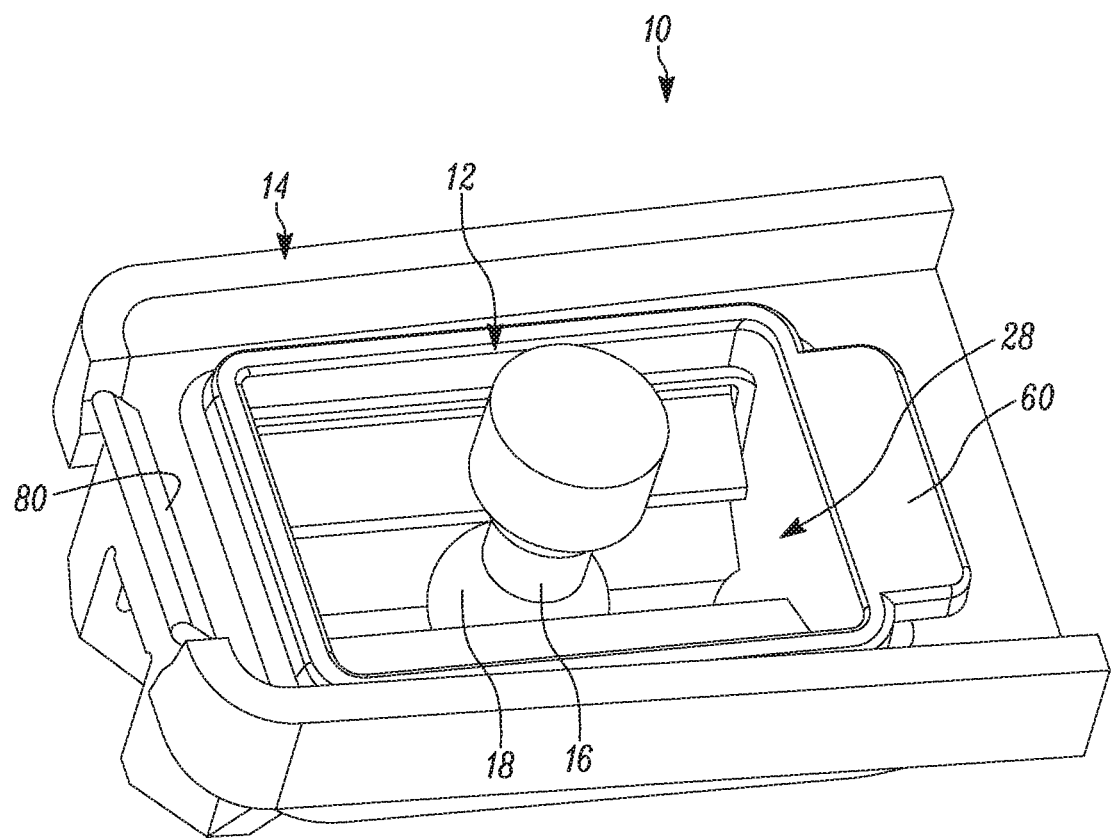
FIG. 1 is a perspective view of an exemplary embodiment of a ball channel assembly having a ball channel secured to a mounting panel, and with a ball stud situated in the ball channel.
Figure 2A:
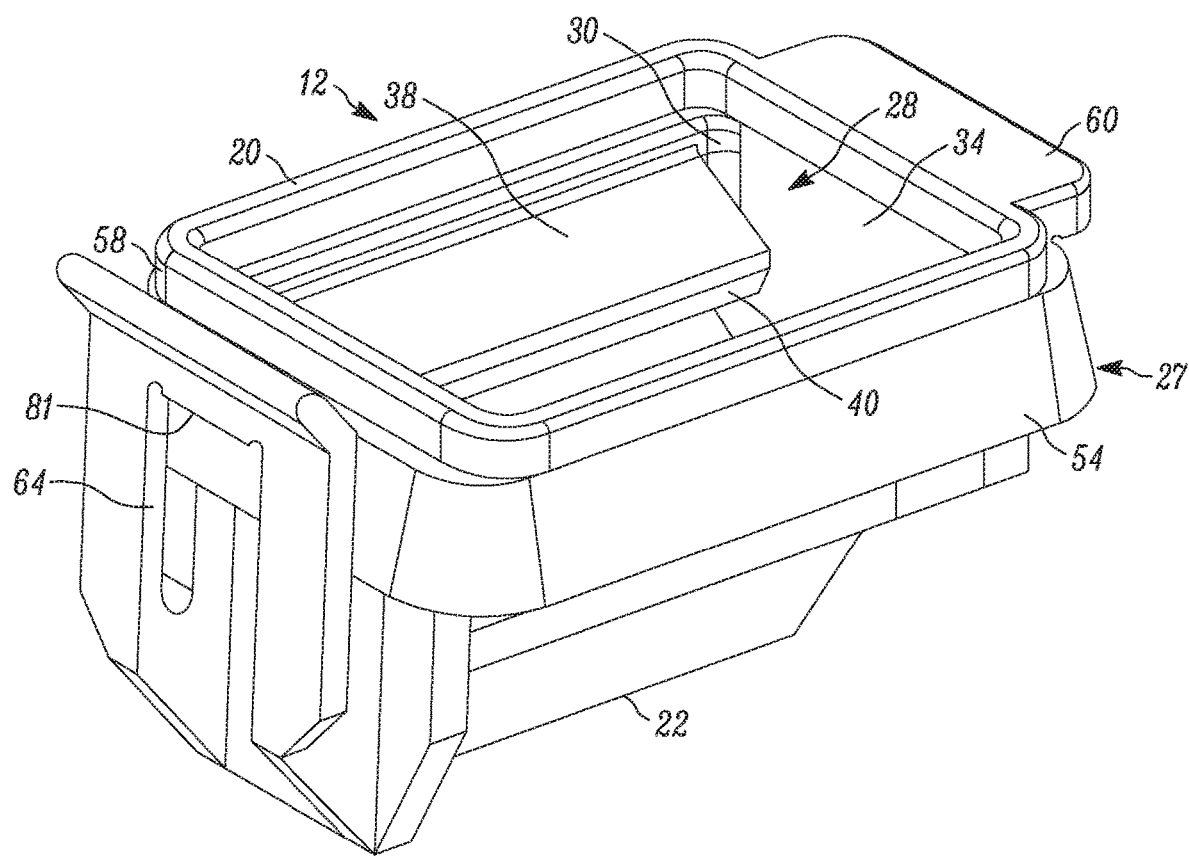
FIG. 2A is a top front perspective view of the ball channel of FIG. 1.
Figure 2B:
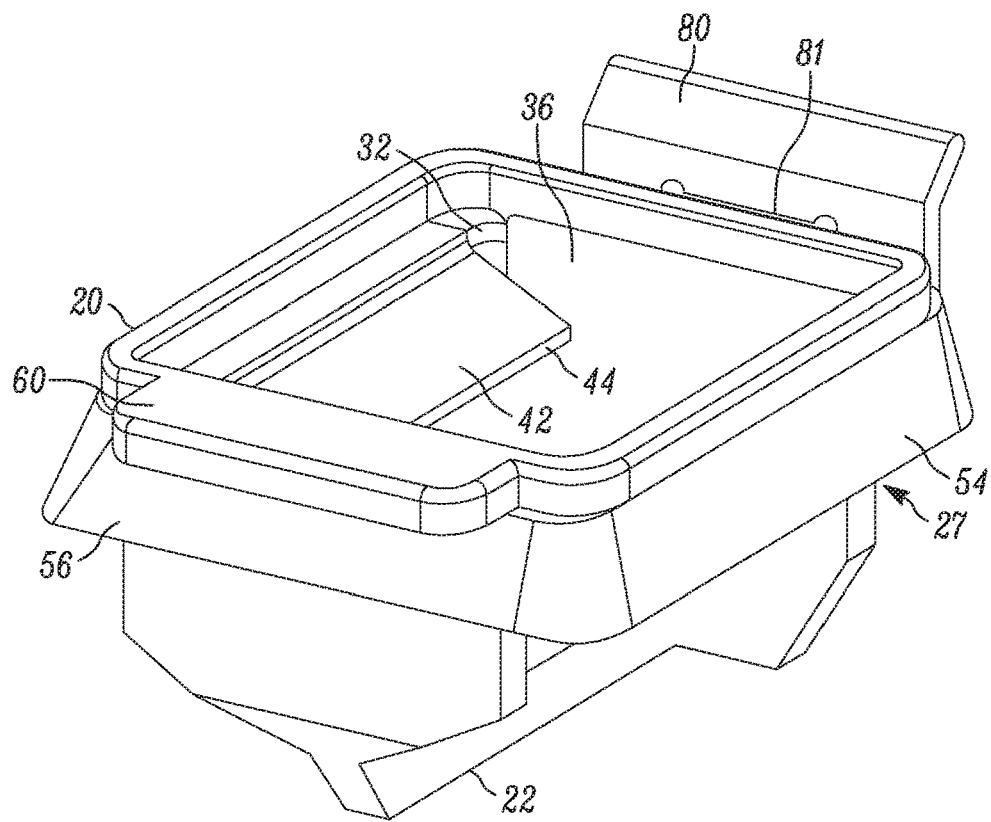
FIG. 2B is a top rear perspective view of the ball channel of FIG. 1.
Figure 2C:
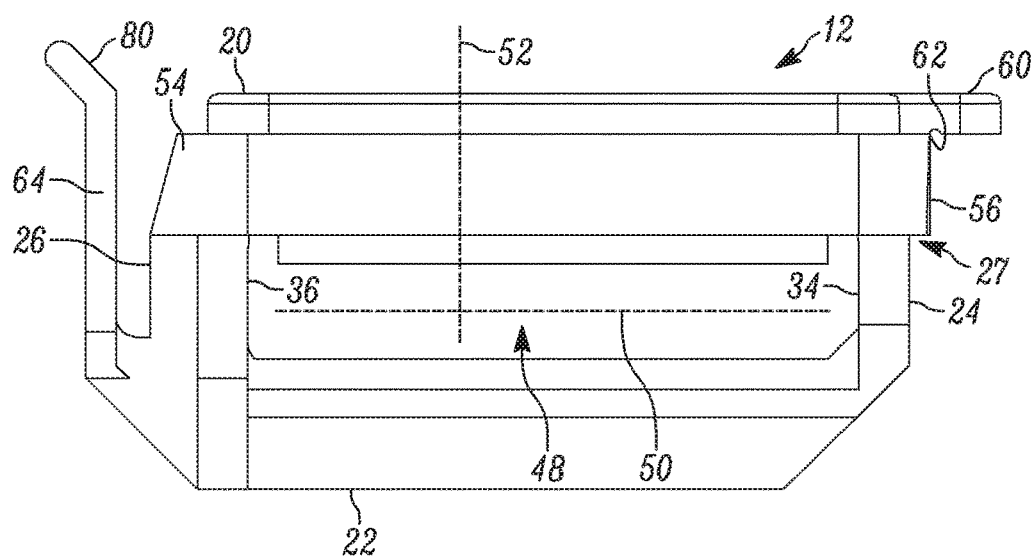
FIG. 2C is a side view of the ball channel of FIG. 1.

FIG. 1 shows an exemplary embodiment of a ball channel assembly 10 that includes a ball channel 12 installed in a mounting panel 14. A representative portion of a ball stud 16 is illustrated that includes a spherical head 18 engaged with the ball channel 12. The mounting panel 14 can be secured to or formed integrally with another component, such as a headlamp assembly. FIGS. 2A-2C provide various exemplary views of the ball channel 12. The ball channel 12 includes a channel top 20, a channel bottom 22, a front end wall 24, and a rear end wall 26 forming an outer portion 27. A first inner sidewall 30 situated opposite a second inner sidewall 32, and a first end wall 34 situated opposite a second end wall 36 form at least in part, an inner portion 28. In at least some embodiments, the first inner sidewall 30, second inner sidewall 32, first end wall 34, and second end wall 36, are distinct wall portions, while in other embodiments, they can be partially or wholly integrated with each other. A first resilient tab 38 extends inward from the first inner sidewall 30 and terminates in a first tab end surface 40. Similarly, a second resilient tab 42 extends inward from the second inner sidewall 32 and terminates in a second tab end surface 44. When the head 18 is pushed into the ball channel 12 via abutment of the first and second resilient tabs 38, 42, the first and second resilient tabs 38, 42 flex downward, the force required to overcome the resiliency of the first and second resilient tabs 38, 42 is identified as an insertion force. Once the head 18 is inserted completely, the first and second resilient tabs 38, 42 spring back to their static position.

An elongated gutter 46 having a gutter top surface 45 is provided below the first and second tab end surfaces 40, 44. The gutter 46, along with the first resilient tab 38 and second resilient tab 42, extend longitudinally along a first axis 50 between the first end wall 34 and the second end wall 36, wherein the combination of the first and second tab end surfaces 40, 44 and the gutter top surface 45, form a ball track 48. The ball track 48 is configured to receive the head 18 of the ball stud 16 and allow longitudinal movement of the head 18 along the first axis 50, while restricting movement along a second axis 52 (FIG. 2C), which extends substantially perpendicular to the first axis 50. In this manner, the head 18 is secured to the ball channel 12, yet allowed to pivot and slide longitudinally within the ball track 48. In addition, to pivoting within the ball track 48, the head 18 can rotate 360 degrees within the ball track 48.

The first and second resilient tabs 38, 42 secure the head 18 of the ball stud 16 when it is inserted into the ball track 48. While it has been found effective to use a configuration of the resilient tabs similar to those disclosed in U.S. Pat. No. 9,140,294, for a non-sliding configuration to anchor a ball stud to a single point, other shapes and designs of resilient tabs could be used for the interaction between the ball channel 12 and the mounting panel 14, as described below, which provides longitudinal movement of the ball stud 16 as well as significant resistance to flexing, so as to provide a high degree of pull out force resistance (resistance to an extraction force of the head 18 from the ball track 48).

The ball channel 12 further includes a flange 53 that extends partially, substantially, or completely around the outer portion of the ball channel 12. The flange 53 includes a flange wall 54. In at least some embodiments, the flange wall 54 is in part or in whole, tapered outward as it extends downward toward the channel bottom 22. Further, in at least some embodiments, the flange wall 54 includes one or more non-tapered portions. In at least some embodiments, the flange wall 54 includes a pivot wall portion 56 that extends below the latching end 60, which in at least some embodiments, is not tapered (extends vertically between the channel top 20 and channel bottom 22) or is less tapered than the other portions of the flange wall 54. Further, in some embodiments, the flange wall 54 is not tapered at all, but provides an abutment with the mounting panel 14, as discussed in detail below, and additionally in other embodiments, the flange wall 54 can include other protruding shapes, such as a right-angle step. The pivot wall portion 56 can assist with installation of the ball channel 12 to the mounting panel 14 as discussed below.

The ball channel 12 further includes a neck wall 58 that extends from the channel top 20 to the flange 53. The neck wall 58 can include a latching end 60, which can be positioned adjacent the front end wall 24. A notch 62 is formed at the intersection of the pivot wall portion 56 and the latching end 60. In addition, a latching fastener 64 can be provided extending from or adjacent to the rear end wall 26, wherein the latching fastener 64 can include one of various fastening configurations, such as a snap-fit latch. In at least some embodiments, the latching fastener 64 includes a ramped snap end portion 80 and a snap engagement ledge 81 situated below the snap end portion for engagement with the mounting panel 14 as discussed below.

Figure 3:
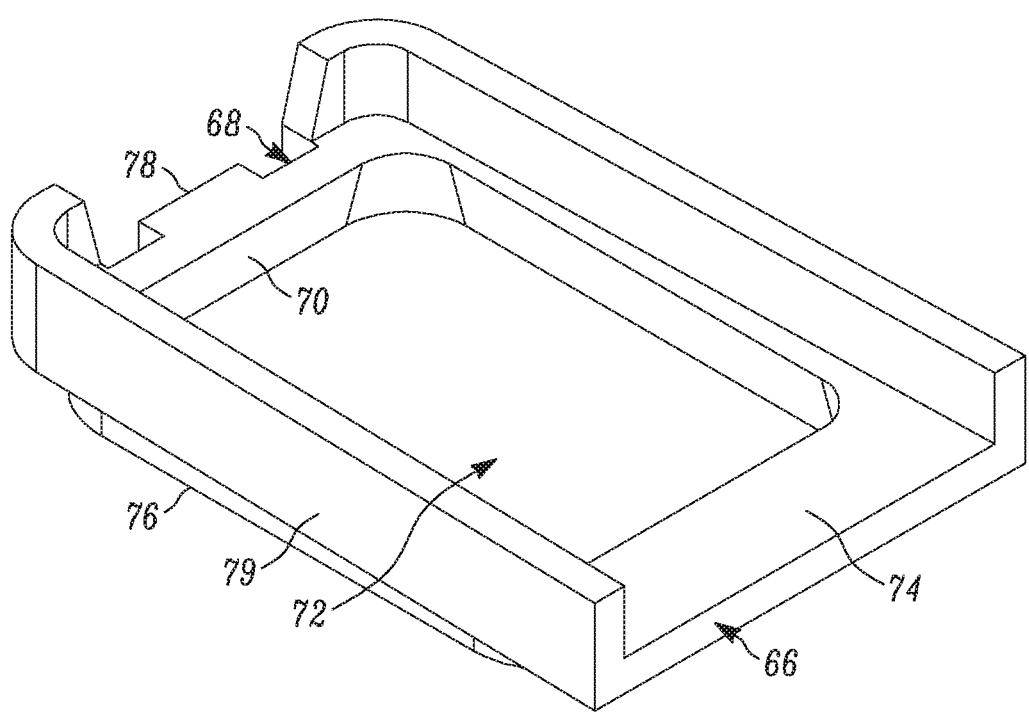
FIG. 3 is a top rear perspective view of the mounting panel of FIG. 1.

Referring to FIG. 3, the exemplary mounting panel 14 is illustrated and includes a front mount portion 66, a rear mount portion 68, a receiving wall 70 that surrounds the inner perimeter of a mounting panel opening 72 and further extends substantially between a top mounting panel surface 74 and a bottom mounting panel surface 76. The mounting panel 14 further includes an outer mount wall 79 situated opposite the receiving wall 70. In addition, a latching protrusion 78 can be provided extending from the rear mount portion 68 for engagement with the latching fastener 64. In at least some embodiments, the mounting panel 14 can further include a ridge wall extending from the top mounting panel surface 74. The receiving wall 70 is sized and shaped to matingly receive and engage the flange wall 54 of the ball channel 12. In this regard, the receiving wall 70 and flange wall 54 can include complementary angles, such as tapering, with the receiving wall 70 tapering inward as it extends towards the bottom mounting panel surface 76 to provide a wedge abutment (fit). The angle of the tapering, as well as the shape of the taper (or other shaped configuration) can vary for both the flange wall 54 and the receiving wall 70, while maintaining a substantially complementary interface. In at least some embodiments, the interface between the receiving wall 70 and flange wall 54 does not permit, or substantially limits, outward flexing of the flange wall 54 when an extraction force is imparted on the first tab end surface 40 and second tab end surface 44 by the head 18. Absent the receiving wall 70, the flange wall 54 would provide less extraction resistance, as discussed below.

Figure 4A:
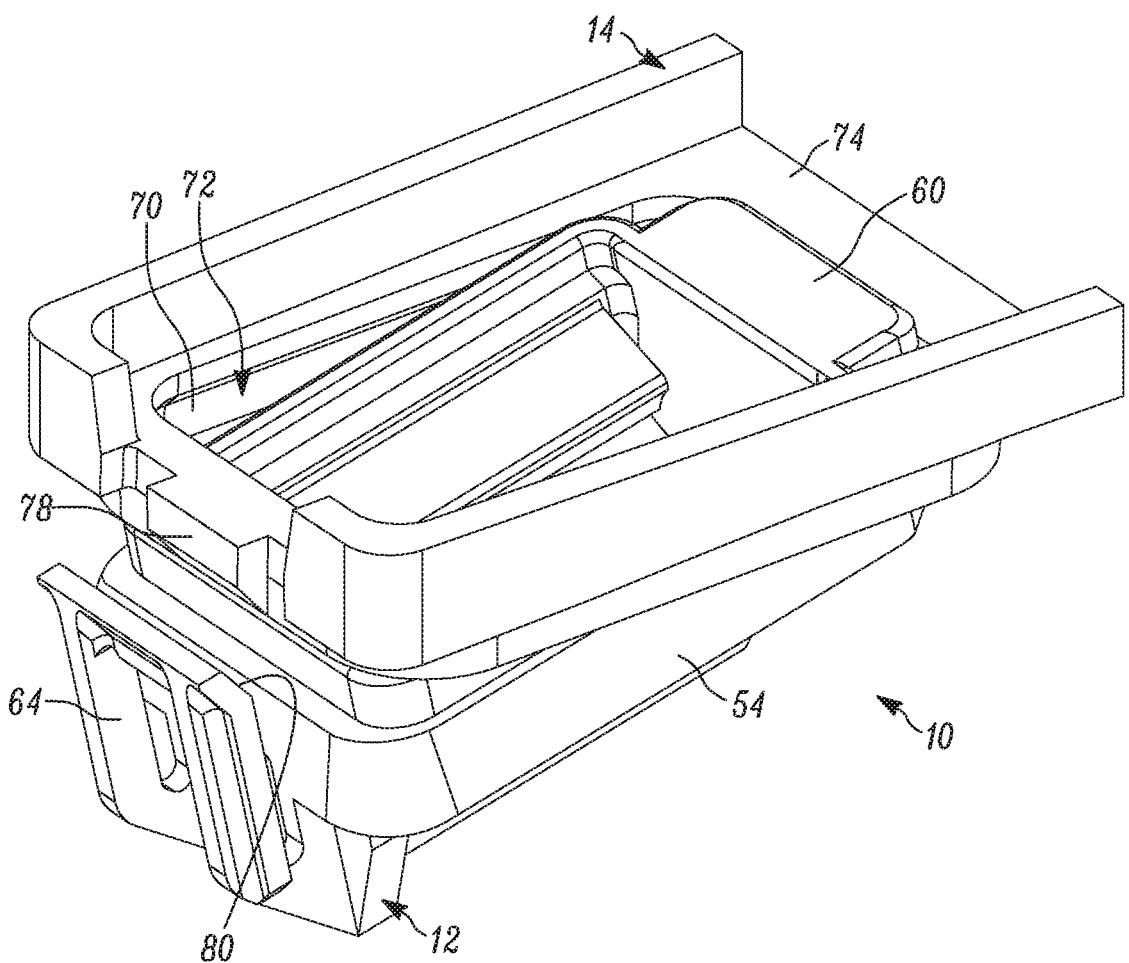
FIG. 4A is a top front perspective view of the ball channel progressively secured to the mounting panel in a starting position.
Figure 4B:
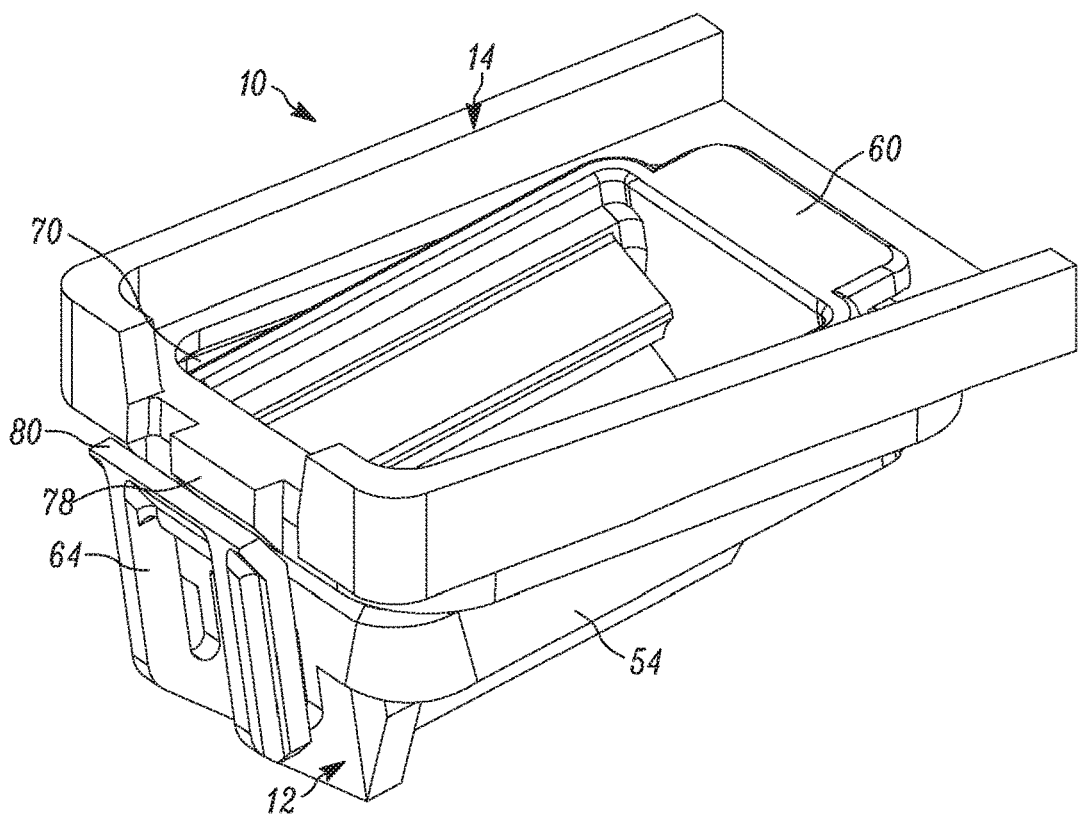
FIG. 4B is a top front perspective view of the ball channel progressively secured to the mounting panel in a middle position.
Figure 4C:
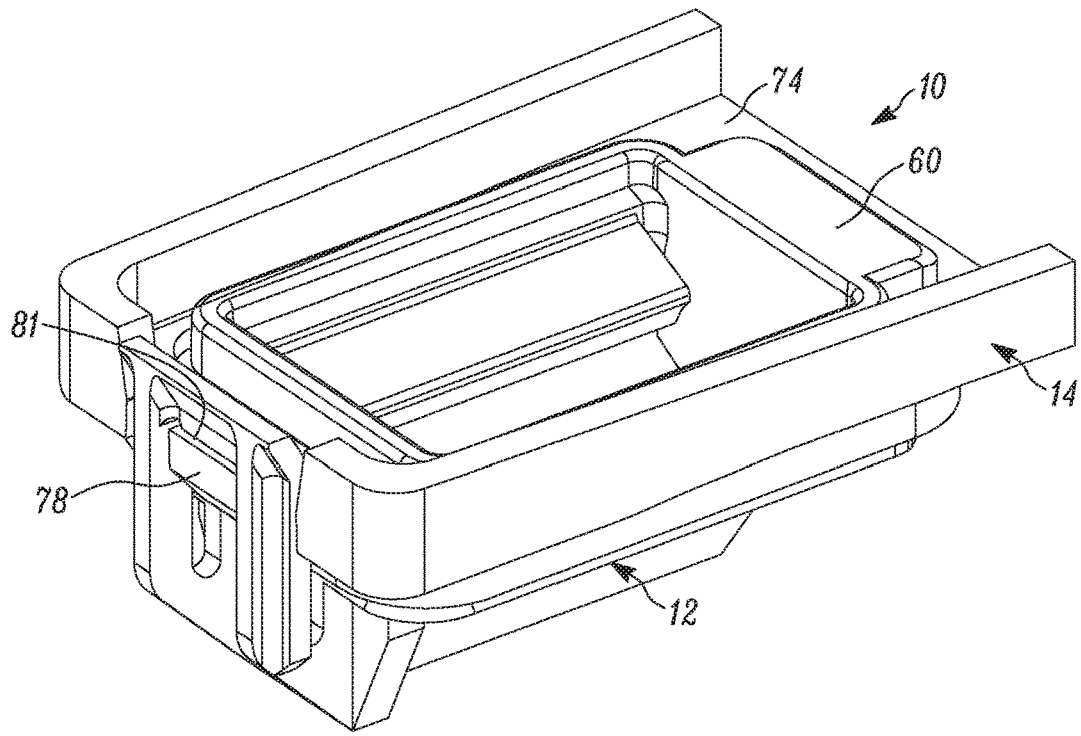
FIG. 4C is a top front perspective view of the ball channel progressively secured to the mounting panel in a final position.

Referring to FIGS. 4A-4C, the installation of the ball channel 12 into the mounting panel opening 72 of the mounting panel 14 is progressively illustrated. As shown in FIG. 4A, the latching end 60 of the ball channel 12 is first inserted through the mounting panel opening 72 of the mounting panel 14 to position the notch 62 on the top mounting panel surface 74 to provide a frictional engagement therewith. In at least some embodiments, the notch 62 is adjacent the top mounting panel surface 74 and is rotated thereon. As shown in FIG. 4B, as the ball channel 12 is hingedly rotated into the mounting panel 14 about the notch 62, assisted by the abutment of the pivot wall portion 56 with the receiving wall 70, to engage the ball channel 12 and mounting panel 14, the snap end portion 80 of the latching fastener 64 is moved upward to abut the latching protrusion 78, and then slides over the latching protrusion 78, while simultaneously the flange wall 54 is inserted into mating engagement with the receiving wall 70. FIG. 4C shows the ball channel 12 secured to the mounting panel 14 after the snap end portion 80 has cleared the latching protrusion 78, thereby positioning the snap engagement ledge 81 onto the latching protrusion 78 and securing the ball channel 12 to the mounting panel 14 such that lateral movement within the mounting panel opening 72 is prevented. Once the ball channel 12 is secured in the mounting panel opening 72, it is prepared to receive the head 18 of the ball stud 16, although in other embodiments, the head 18 can be inserted to the ball channel 12 prior to engagement with the mounting panel 14.

Figure 5:
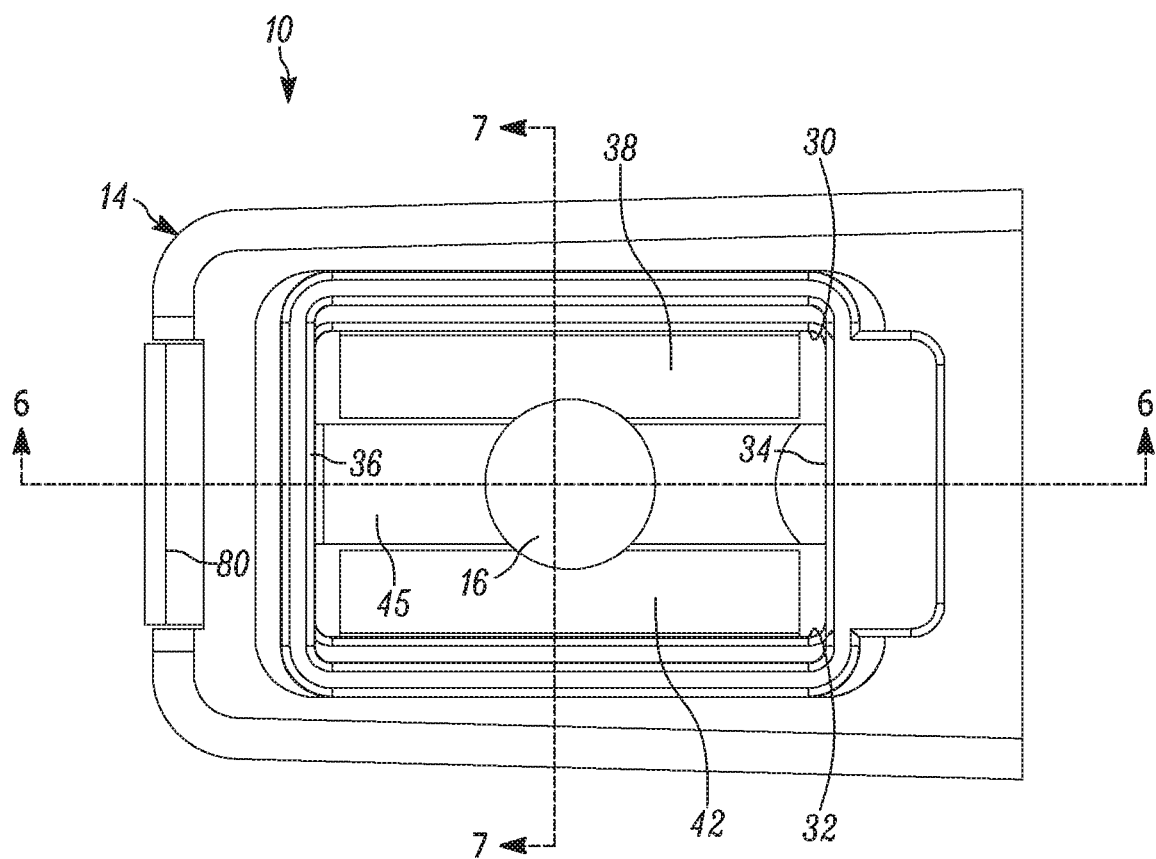
FIG. 5 is a top view of the ball channel assembly and ball stud of FIG. 1.
Figure 6:
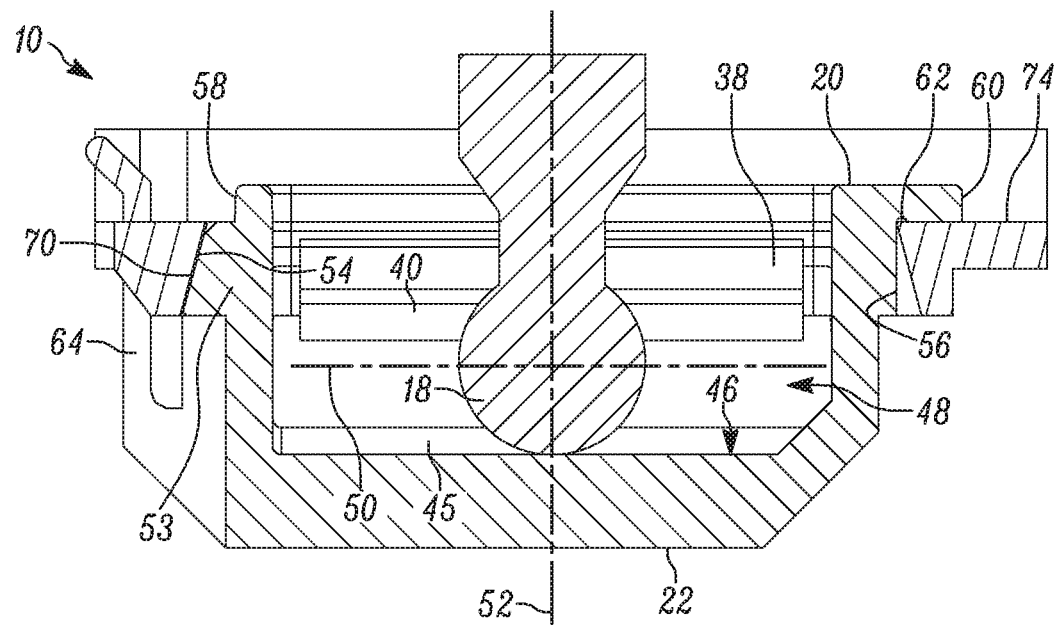
FIG. 6 is a cross-sectional side view of the ball channel assembly and ball stud of FIG. 1, taken generally along the line 6-6 in FIG. 5.
Figure 7:
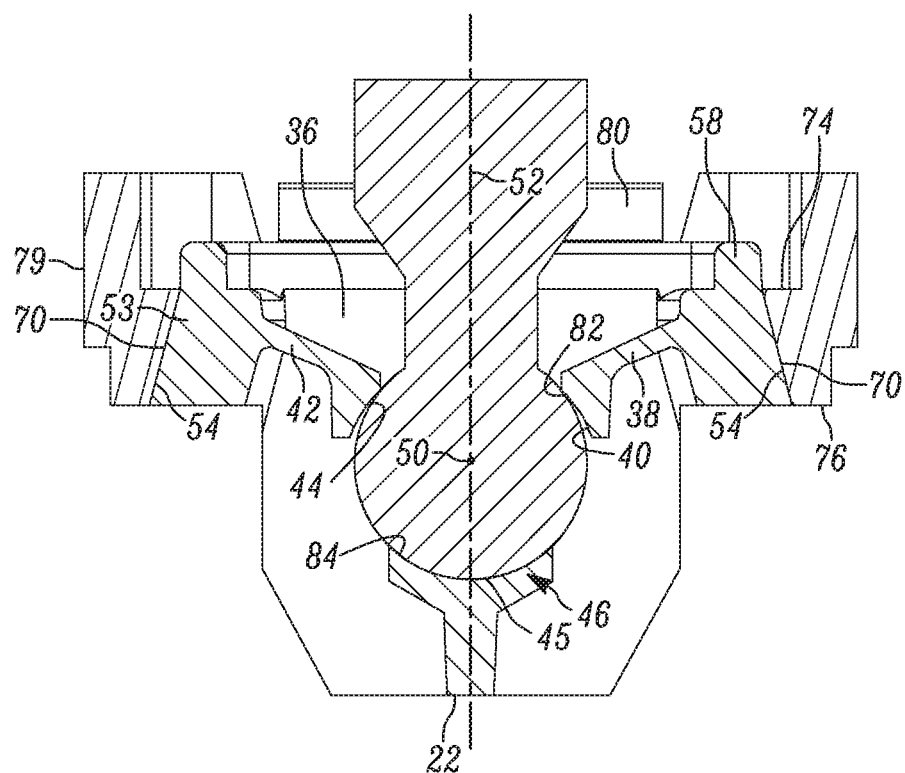
FIG. 7 is a cross-sectional view of the ball channel assembly and ball stud of FIG. 1, taken generally along the line 7-7 in FIG. 5.

FIGS. 5-7 provide multiple views of the ball channel 12 secured to the mounting panel 14 and with the head 18 engaged in the ball track 48. As shown in FIGS. 5 and 6, after the head 18 has been inserted in the ball track 48, it is free to pivot and move longitudinally along the ball track 48. As best seen in FIG. 7, once inserted, the head 18 is situated in at least partial abutment with the first and second tab end surfaces 40, 44 along an upper head portion 82, and in abutment with the gutter top surface 45 along a lower head portion 84. These abutments are continuous along the length of the ball track 48, and as such, serve to substantially limit or prevent movement of the head 18 along the second axis 52 while allowing the head 18 to pivot and to move along the first axis 50.

The angled positioning of the first resilient tab 38 and second resilient tab 42 provide a resistive force directed towards the first axis 50, resulting in a pull out force resistance against the head 18 when an extraction force is applied to remove the ball stud from the ball channel 12. In addition, the wedged abutment of the flange wall 54 with the receiving wall 70 serves to further enhance the resistive force directed towards the first axis 50. More particularly, an extraction force is imparted from the head 18 to the first and second tab end surfaces 40, 44, such that the flange wall 54 is pushed outwards as it resists the force of the first and second resilient tabs 38, 42. The addition of the receiving wall 70 being in wedged abutment with the flange wall 54 serves to limit the outward flexing of the flange wall 54, thereby requiring a higher extraction force to remove the head 18 than would be required without the wedged abutment from the receiving wall 70. Further, the aforementioned configuration allows for an increased pull out force resistance while maintaining a lower insertion force. In contrast, merely increasing the rigidity of the first and second resilient tabs 38, 42 and the surrounding flange wall 54 without the wedged abutment provided by the mounting panel 14, would increase the pull out force resistance, but would also increase the required insertion force, as well as reduce the plasticity of the components, resulting in difficult installations and higher insertion damage rates.

Figure 8:
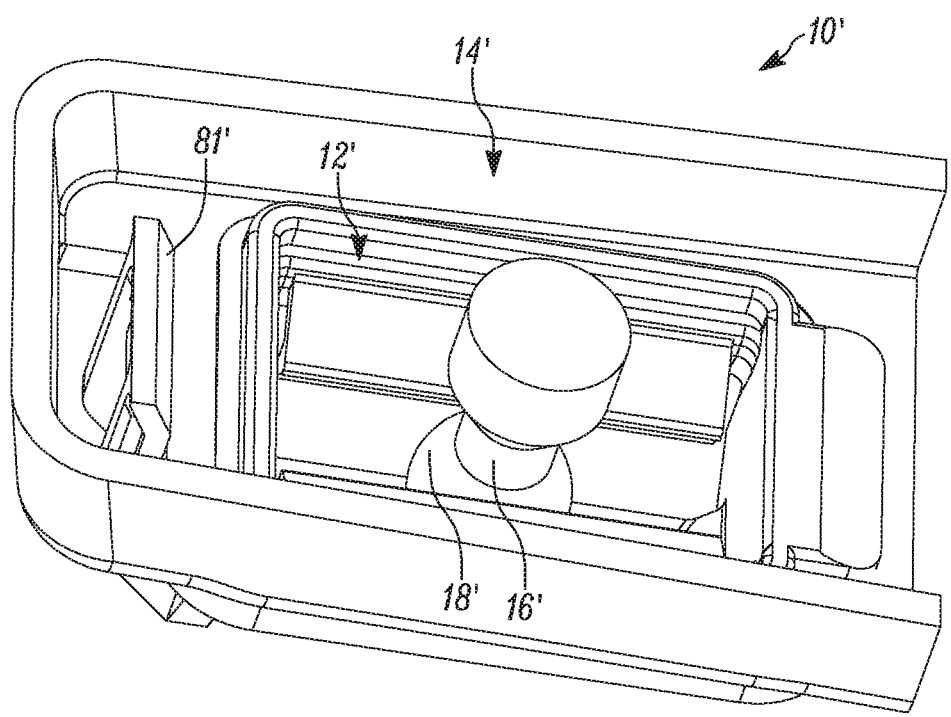
FIG. 8 is a perspective view of another exemplary embodiment of the ball channel assembly having the ball channel secured to the mounting panel, and with the ball stud situated in the ball channel.

Further in other embodiments, such as provided in FIGS. 8-13, various other shapes and configurations can be provided without diverging from the principles and benefits of the invention. More particularly, FIG. 8 illustrates a perspective view of another exemplary embodiment of a ball channel assembly 10' having the ball channel 12' secured to the mounting panel 14', and with the ball stud 16' situated in the ball channel 12'. As shown in the FIGS., various elements of the ball channel assemblies 10 and 10' are substantially similar, or the same, in both structure and function, while other elements provide a similar function, but can include structural modifications. As such, the elements of the ball channel assembly 10' are provided with similar element numbers, but with a prime symbol (') appended thereto, and further, the use and engagement of the components of the ball channel assembly 10 as discussed above, is sufficiently applicable to the corresponding components discussed below for the ball channel assembly 10', and are therefore not repeated. In addition, elements shown in FIGS. 8-13 that were not identified in FIGS. 1-7, also include a prime symbol appended thereto for clarity, although they can be equally applicable to modified versions of the ball channel assembly provided in FIGS. 1-7. Similar to the ball channel assembly 10, the ball channel assembly 10' provides a longitudinal movement of the head 18' within a ball track 48' along a first axis 50', while providing substantial pull out resistance along a second axis 52' (perpendicular or substantially perpendicular to the first axis 50'), and accomplishes that without substantially increasing the insertion force required to install the head 18' in the ball track 48'.

Figure 9A:
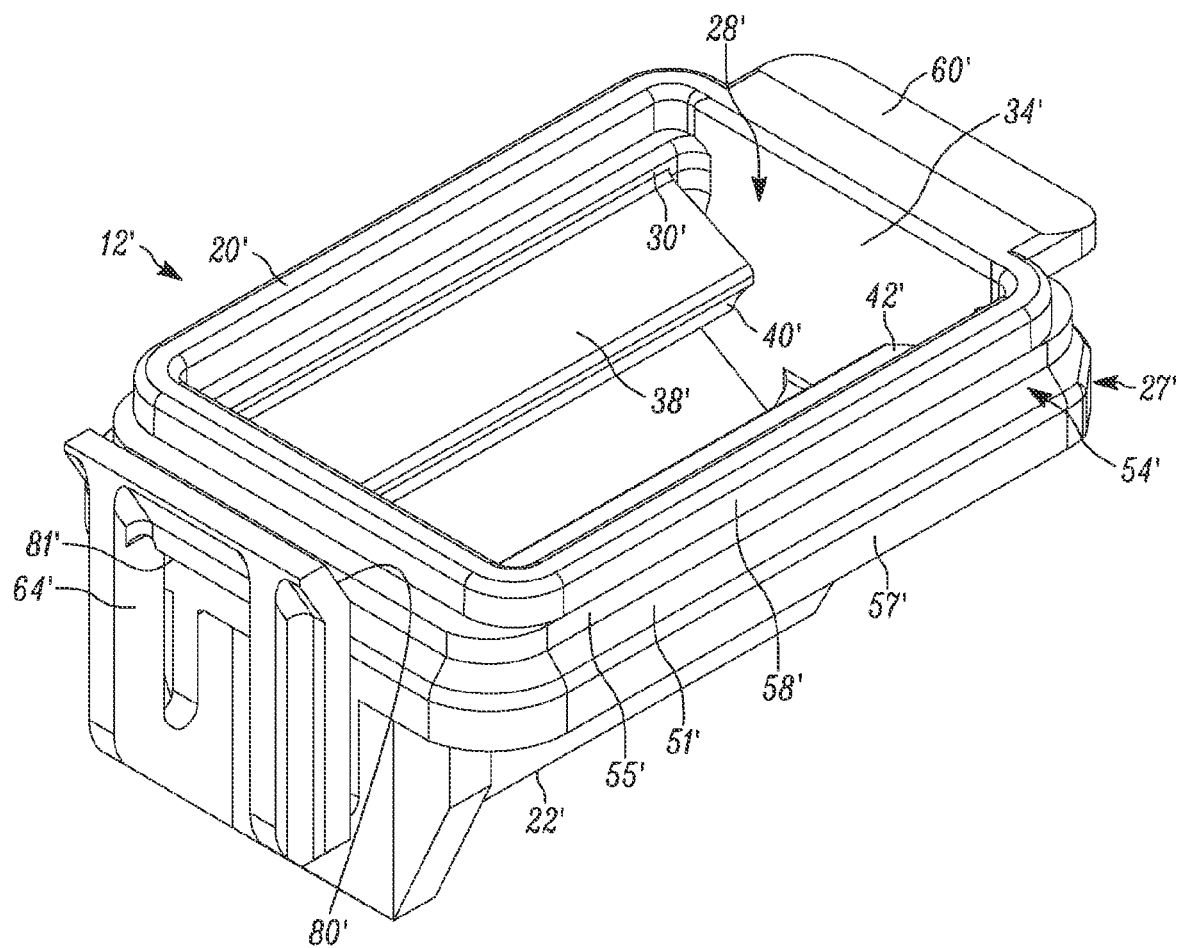
FIG. 9A is a top front perspective view of the ball channel of FIG. 8.
Figure 9B:
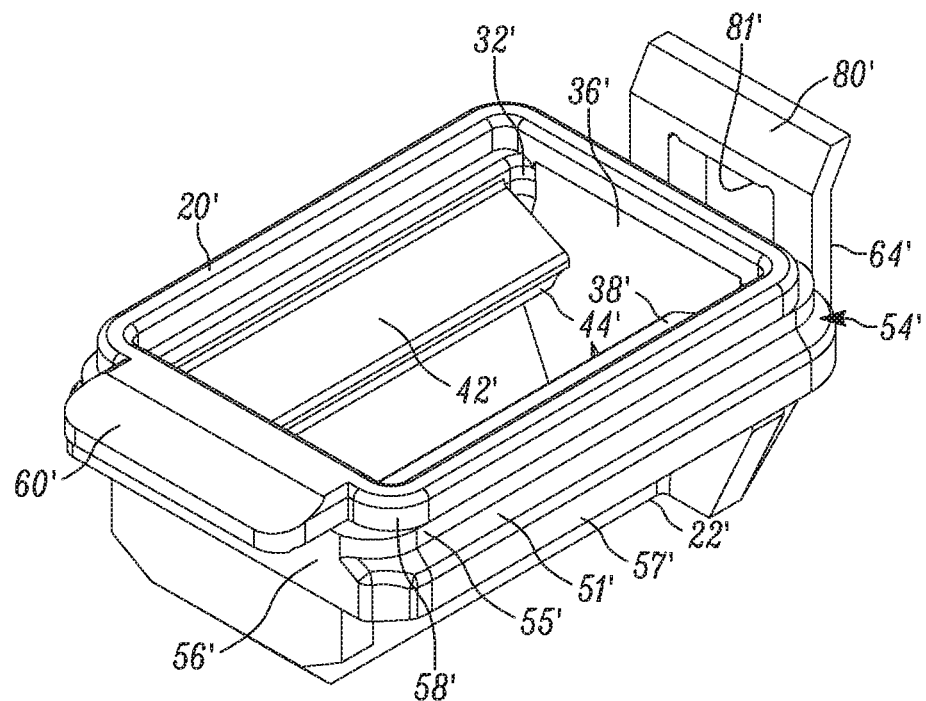
FIG. 9B is a top rear perspective view of the ball channel of FIG. 8.
Figure 9C:
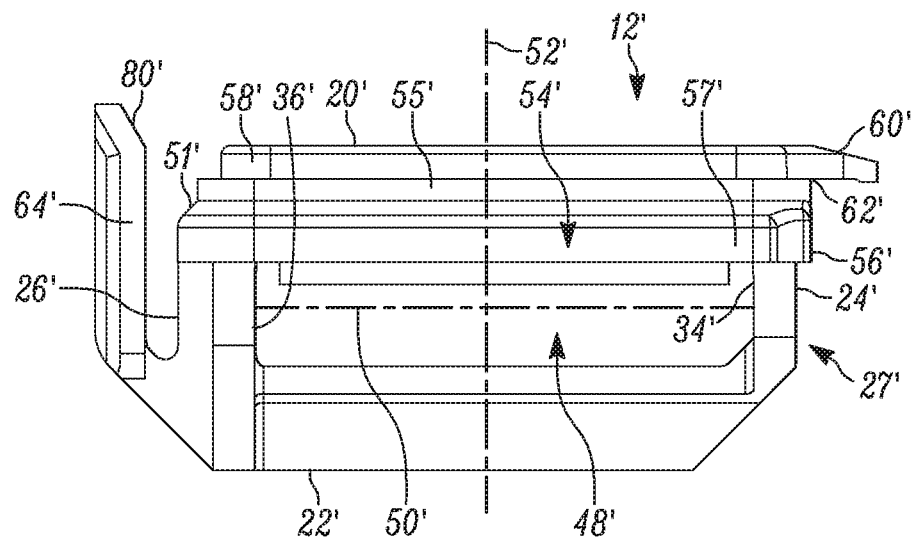
FIG. 9C is a side view of the ball channel of FIG. 8.

Referring now to FIGS. 9A-9C, although the flange wall 54 can be singular in configuration, as described above, in at least some embodiments, the flange wall 54' is comprised of a plurality of walls. More particularly, in at least some embodiments, the flange wall 54' includes a center flange wall 51' positioned between an upper flange wall 55' and a lower flange wall 57'. It is to be understood that references to the flange wall 54' includes a wall comprised of one or more of the center flange wall 51', the upper flange wall 55', and the lower flange wall 57'.

The upper flange wall 55' extends between the neck wall 58' and the center flange wall 51'. The lower flange wall 57' extends downward from the center flange wall 51' towards the channel bottom 22' and can be offset from the upper flange wall 55'. In at least some embodiments, the upper flange wall 55' and the lower flange wall 57' extend substantially vertically (parallel to the second axis 52') and the center flange wall 51' is angled with respect to the second axis 52 (to provide a tapered center flange wall 51'), while in some other embodiments, the upper flange wall 55', lower flange wall 57', and the center flange wall 51'can have varied angles relative to the second axis 52, for example the upper flange wall 55' and/or the lower flange wall 57' can be tapered and/or vertically offset from one another, while the center flange wall 51' can extend vertically, or any other such combination therebetween. Further, in at least some embodiments, the upper flange wall 55 and the lower flange wall 57' are parallel to each other and non-parallel with the center flange wall 51'.

Figure 11:
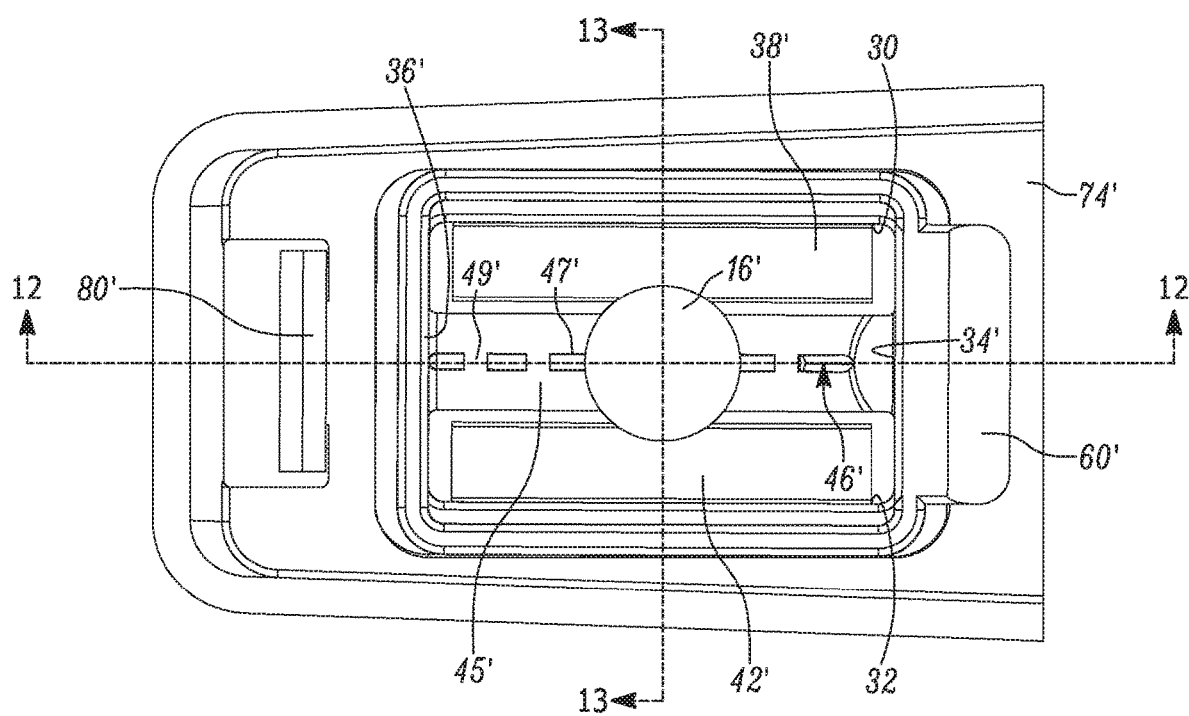
FIG. 11 is a top view of the ball channel assembly and ball stud of FIG. 8.
Figure 12:
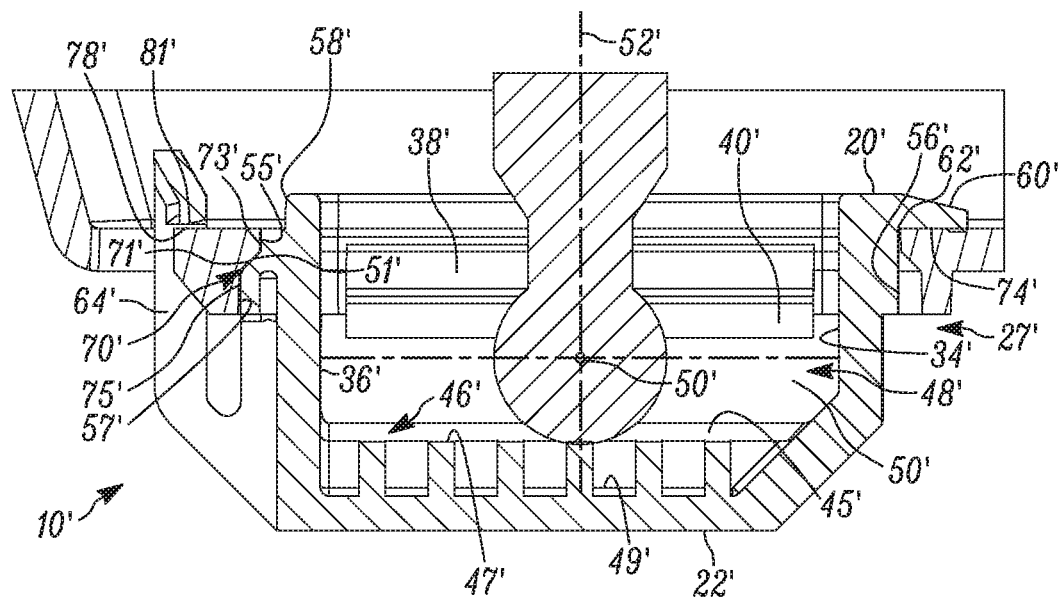
FIG. 12 is a cross-sectional side view of the ball channel assembly and ball stud of FIG. 11, taken generally along the line 12-12 in FIG. 11.

The ball channel 12' includes the gutter 46', which in at least some embodiments, is substantially continuous or continuous, such as shown in FIGS. 5 and 6, while in some other embodiments, such as shown in FIGS. 11 and 12, it can be comprised of a plurality of pedestals 47' in spaced relation, forming a non-continuous surface. In contrast to one embodiment of gutter 46 providing a continuous and smooth gutter top surface 45, the non-continuous gutter top surface 45' of gutter 46' can in at least some embodiments, form mild stops in the form of gaps 49' between each pedestal 47'. In at least some embodiments, these gaps 49' can serve to provide a resistance to a longitudinal moment of the head 18 along the ball track 48' be allowing the head 18' to sink slightly therein, which can serve to assist with maintaining the position of the head 18 after an adjustment, while in other embodiments, the gaps 49' do not provide an impediment to the movement of the head 18.

Figure 10:
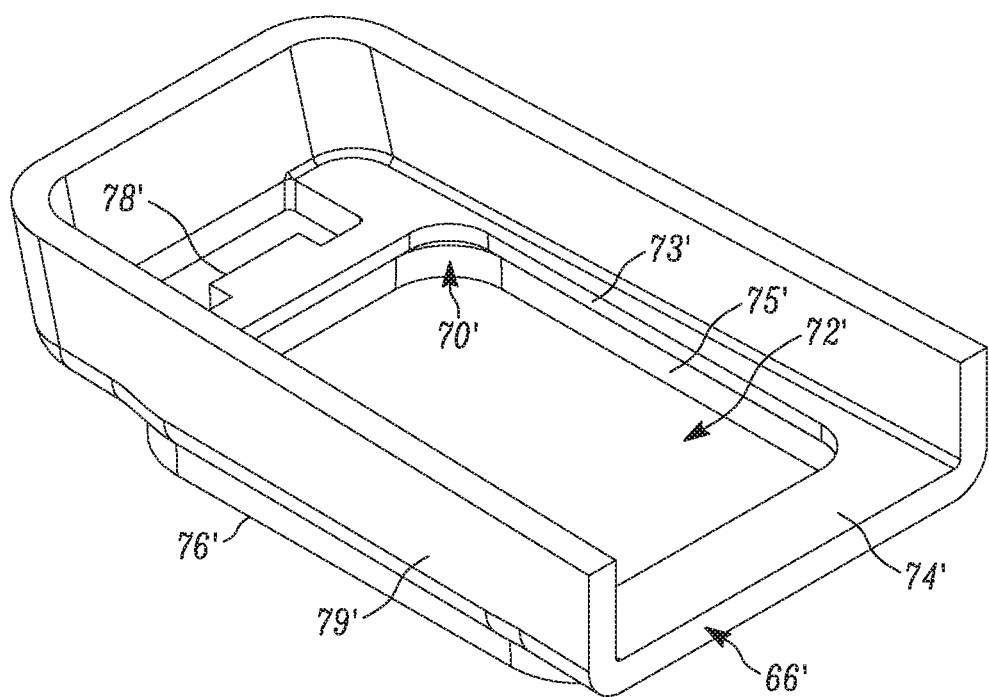
FIG. 10 is a top rear perspective view of the mounting panel of FIG. 8.
Figure 13:
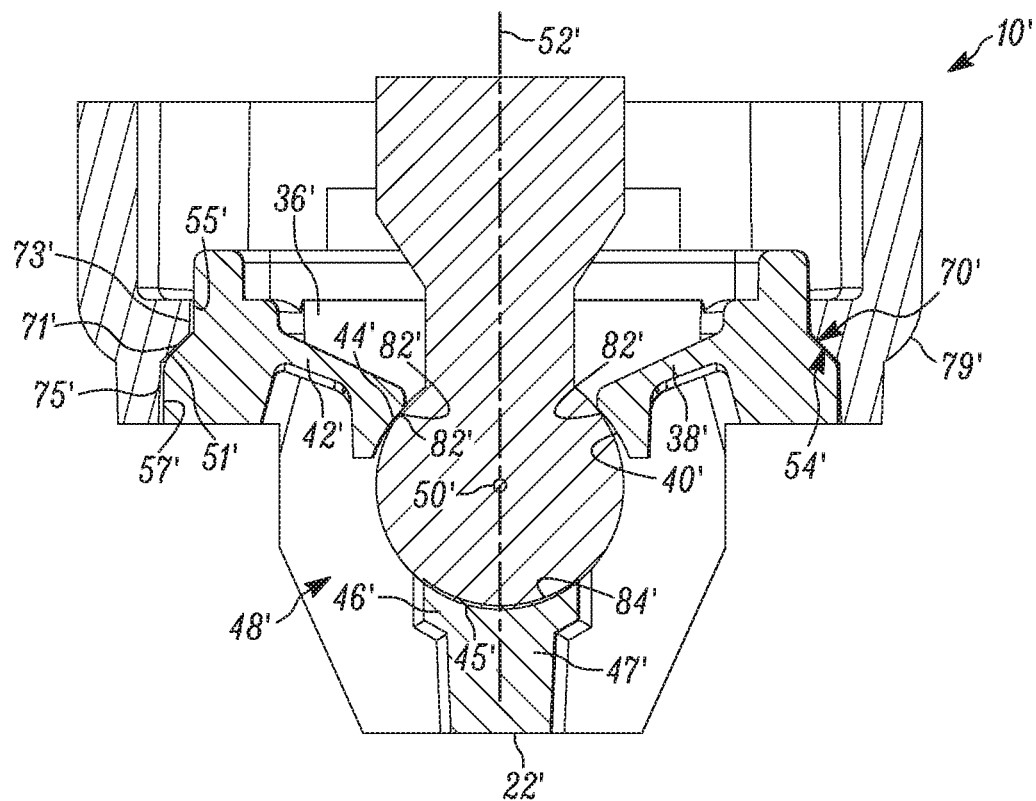
FIG. 13 is a cross-sectional view of the ball channel assembly and ball stud of FIG. 11, taken generally along the line 13-13 in FIG. 11.

Referring to FIGS. 10, 12, and 13, the mounting panel 14' varies in structure from the mounting panel 14 illustrated in FIG. 3. More particularly, in at least some embodiments, the receiving wall 70' can be comprised of a plurality of walls, such as a center receiving wall 71' situated between an upper receiving wall 73' and a lower receiving wall 75', with the receiving wall 70' extending in part or in whole, between the top mounting panel surface 74' and the bottom mounting panel surface 76'.

The portions of the receiving wall 70' can take various forms. In at least some embodiments, the upper receiving wall 73' and the lower receiving wall 75' extend substantially vertically (parallel to the second axis 52') and the center receiving wall 71' is angled with respect to the second axis 52 (to provide a tapered center receiving wall 71'), while in some other embodiments, the upper receiving wall 73', lower receiving wall 75', and center receiving wall 71' can have varied angles relative to the second axis 52, for example the upper receiving wall 73' and/or the lower receiving wall 75' can be tapered and/or vertically offset from one another, while the center receiving wall 71' extends vertically, or any other such combination therebetween. Although the portions of the receiving wall 70' can take many forms, in at least some embodiments, the receiving wall 70' is shaped and sized to matingly receive and engage the flange wall 54'. As such, the angled surfaces of the flange wall 54' and receiving wall 70' shall in at least some embodiments, include complementary angles (such as shown in exemplary FIG. 13).

The flange wall 54' of the ball channel 12' is configured to be complementarily engaged, in part or in whole, with the receiving wall 70' of the mounting panel 14'. As discussed above with regard to the flange wall 54 and receiving wall 70, when the ball channel 12' is secured to the mounting panel 14', the receiving wall 70' serves to provide additional support to the first and second resilient tabs 38',42' via the flange wall 54', during the application of an extraction force imparted from the head 18 to the first tab end surface 40' and second tab end surface 44'. The additional support increases the pull out resistance provided by ball channel assembly 10', and does so without significantly increasing the insertion force of the head 18.

The installation of the ball channel 12' into the mounting panel 14' is similar to the procedure as shown and described above with reference to FIGS. 4A-4C. More particularly, the latching end 60' of the ball channel 12' is first inserted through the mounting panel opening 72' to position the notch 62' on the top mounting panel surface 74'. As the ball channel 12' is hingedly rotated into the mounting panel 14', via the notch 62' and the abutment of the pivot wall portion 56' with the receiving wall 70', to engage the ball channel 12' and mounting panel 14', the snap end portion 80' of the latching fastener 64' is moved upward to abut the latching protrusion 78', and then slides over the latching protrusion 78', while simultaneously the flange wall 54' (e.g., one or more portions of the flange wall 54', such as the upper flange wall 55' and/or the lower flange wall 57') is inserted into mating engagement with the receiving wall 70'. The ball channel 12' is secured to the mounting panel 14' after the snap end portion 80' has cleared the latching protrusion 78', thereby positioning the snap engagement ledge 81' onto the latching protrusion 78' and securing the ball channel 12' to the mounting panel 14'. Once the ball channel 12' is secured in the mounting panel opening 72', it is prepared to receive the head 18' of the ball stud 16', although in other embodiments, the head 18' can be inserted to the ball channel 12' prior to engagement with the mounting panel 14'.

The ball channel can vary in shape, thickness and material of construction as required for a particular application. The mounting panel and mounting panel opening can have different shapes and geometries, typically as defined by the manufacturer of the part into which the ball channel will fit, for example, square, rectangular, etc. In at least some embodiments, the head is spherical and the first and second tab end surfaces, as well as the gutter, are curved to matingly receive and/or engage the head, while in other embodiments, other shapes can be utilized to accordingly receive and/or engage a non-spherical head. In addition, the aforementioned components can be comprised of one or more different materials, such as plastic, metal, etc., either alone or in combination.

The mounting panel can be a singular component, or formed or otherwise secured to any one of numerous assemblies, substrates, device, etc. In at least some embodiments, the mounting panel is formed as a portion of a headlamp assembly of an automobile. In at least some embodiments, a headlamp assembly comprised of multiple mounting panels can be utilized with associated ball channels to secure the headlamp assembly to an automobile in an adjustable manner. Further, the ball channel assembly can be used in a multitude of non-automotive lamp situations where similar performance capabilities are required.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein. It shall be understood that the term "plurality" can represent one or more of an element.

What is claimed is:

1. A ball channel assembly comprising:
   a ball channel comprising:
      a channel top and a channel bottom;
      an inner portion including a first inner sidewall, a second inner sidewall, a first end wall, and a second end wall;
      a first resilient tab extending from the first inner sidewall and having a first tab end surface opposite the first inner sidewall;
      a second resilient tab extending from the second inner sidewall and having a second tab end surface opposite the second inner sidewall;
      an elongated gutter extending longitudinally along the inner portion and adjacent the channel bottom; and
      an outer portion including a flange extending substantially therearound, wherein the flange includes a flange wall; and
   a mounting panel comprising:
      a loop-shaped receiving wall that extends between a top mounting panel surface and a bottom mounting panel surface, and forming a mounting panel opening therebetween for receiving the ball channel therein, wherein the flange wall of the ball channel is complementary in shape to the receiving wall, such that a upon securement of the ball channel to the mounting panel, the flange wall and the receiving wall are in mating abutment.

2. The assembly of claim 1, wherein the combination of the first and second tab end surfaces and a gutter top surface form a ball track for receiving and engaging a head of a ball stud to allow sliding longitudinal movement of the head along a first axis extending between the first and second end walls, while restricting movement of the head along a second axis perpendicular to the first axis.

3. The assembly of claim 2, wherein the receiving wall and the flange wall are complementary in shape.

4. The assembly of claim 3, wherein the receiving wall includes an upper receiving wall that extends above a center receiving wall, and a lower receiving wall that extends below the center receiving wall, and wherein the center receiving wall is tapered.

5. The assembly of claim 4, wherein the flange wall includes a center flange wall, an upper flange wall that extends above the center flange wall, and a lower flange wall that extends below the center flange wall, and wherein the center flange wall is tapered.

6. The assembly of claim 5, wherein the upper flange wall and the lower flange wall are parallel to each other and non-parallel with the center flange wall.

7. The assembly of claim 5, wherein the upper flange wall and the lower flange wall are offset from each other relative to the inner portion, with the lower flange wall situated farther out relative to the inner portion.

8. A ball channel assembly comprising:
  a ball channel comprising:
    a channel top and a channel bottom;
    an inner portion including a plurality of walls;
    an outer portion including a flange adjacent the channel top and extending substantially therearound,
    a neck wall adjacent the channel top having a latching end extending therefrom, wherein the flange includes a flange wall having a pivot wall portion situated below the latching end of the neck wall; and
    a latching fastener extending from the outer portion and having a snap engagement ledge; and
  a mounting panel comprising:
    a loop-shaped receiving wall that extends between a top mounting panel surface and a bottom mounting panel surface, forming a mounting panel opening therebetween for receiving the ball channel therein, wherein the receiving wall is substantially complementary in shape to the flange wall of the ball channel, such that securement of the mounting panel to the ball channel provides mating abutment substantially between the flange wall and the receiving wall; and
    a latching protrusion extending from the top mounting panel surface, for receiving the snap engagement ledge thereon when the ball channel is engaged with the mounting panel.

* * * * *